United States Patent
Nakagawa et al.

(10) Patent No.: US 11,243,742 B2
(45) Date of Patent: Feb. 8, 2022

(54) DATA MERGE PROCESSING BASED ON DIFFERENCES BETWEEN SOURCE AND MERGED DATA

(71) Applicant: INTERNATIONAL BUSINESS MACHINES CORPORATION, Armonk, NY (US)

(72) Inventors: Asuka Nakagawa, Kawasaki (JP); Koji Nakase, Kamakura (JP); Shuhichi Murai, Machida (JP); Takato Izaiku, Toshima-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 16/238,852

(22) Filed: Jan. 3, 2019

(65) Prior Publication Data
US 2020/0218507 A1 Jul. 9, 2020

(51) Int. Cl.
*G06F 16/23* (2019.01)
*G06F 7/14* (2006.01)

(52) U.S. Cl.
CPC ............ *G06F 7/14* (2013.01); *G06F 16/2379* (2019.01)

(58) Field of Classification Search
CPC .............................. G06F 7/14; G06F 16/2379
USPC ........................................................ 707/756
See application file for complete search history.

(56) References Cited

U.S. PATENT DOCUMENTS

| | | | |
|---|---|---|---|
| 7,403,942 B1 * | 7/2008 | Bayliss | G06F 16/215 707/748 |
| 7,698,268 B1 * | 4/2010 | Adams | G16H 50/20 707/765 |
| 2004/0172393 A1 * | 9/2004 | Kazi | G06F 16/313 |
| 2006/0218405 A1 | 9/2006 | Ama et al. | |
| 2006/0294151 A1 * | 12/2006 | Wong | G06F 16/25 |
| 2008/0205755 A1 * | 8/2008 | Jackson | G06K 9/6212 382/168 |
| 2009/0240746 A1 | 9/2009 | Chirlian et al. | |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Kuen S Lu
(74) *Attorney, Agent, or Firm* — William Hartwell; Matthew M. Hulihan; Heslin Rothenberg Farley & Mesiti PC

(57) ABSTRACT

Data merge processing based on difference between source and merged data includes creating merged data from a source data records, the merged data including data fields, performing a difference determination as between the merged data and the source data records, the difference determination including, for each source data record of the source data records, comparison of data in data fields of the merged data to the source data record, and performing processing with respect to the merged data based on the difference determination. Performing processing can include aborting a merge operation to save a merged data record with the merged data, or storing and maintaining a merged data record including the merged data, based on the difference determination determining, for each source data record of the source data records, that the degree of difference between the merged data and the source data record does not exceed a threshold.

20 Claims, 9 Drawing Sheets

(56) References Cited

U.S. PATENT DOCUMENTS

| | | |
|---|---|---|
| 2012/0179990 A1 | 7/2012 | Curbera et al. |
| 2017/0193043 A1* | 7/2017 | Li .................. G06F 16/24535 |
| 2018/0121519 A1* | 5/2018 | Cook ................ G06F 16/2471 |
| 2018/0277246 A1* | 9/2018 | Zhong ................ G06F 16/288 |

* cited by examiner

Report of list of information items having high degree of difference

602 — A1 < - > X2     Score   80
Name : Saito Ichiro     0
DOB :11/21/1977     0
Gender : Male     0
E-mail : SACHO@xxx.meijp     20
Addr : Hachioki city 2-3 1A     20
Phone Num : 09032328678     20

604 — B1 < - > X2     Score   70
Name : Saito Ichiro     0
DOB :11/21/1977     0
Gender : Male     0
E-mail : SACHO@xxx.meijp     20
Addr : Hachiozi city 3-3 1A     20
Phone Num : 09032328827     20

FIG. 6

DATA MERGE PROCESSING BASED ON DIFFERENCES BETWEEN SOURCE AND MERGED DATA

BACKGROUND

In a merge operation to merge source data records, for instance records holding customer information, a so-called "merge key", commonly stored in or with the source data, is used in identifying a common entity (e.g. customer) for which the information is to be merged. Some or all of the source data is consolidated by a survivorship process dictating various rules that take into account factors like priority and/or newest updates for each source data record.

SUMMARY

Shortcomings of the prior art are overcome and additional advantages are provided through the provision of a computer-implemented method. The method creates merged data from a source data records, the merged data including data fields. The method performs a difference determination as between the merged data and the source data records. The difference determination includes, for each source data record of the source data records, comparison of data in data fields of the merged data to the source data record. The method also performs processing with respect to the merged data based on the difference determination.

Further, a computer system is provided that includes a memory and a processor in communication with the memory. The computer system is configured to perform a method. The method creates merged data from a source data records, the merged data including data fields. The method performs a difference determination as between the merged data and the source data records. The difference determination includes, for each source data record of the source data records, comparison of data in data fields of the merged data to the source data record. The method also performs processing with respect to the merged data based on the difference determination.

Yet further, a computer program product including a computer readable storage medium readable by a processing circuit and storing instructions for execution by the processing circuit is provided for performing a method. The method creates merged data from a source data records, the merged data including data fields. The method performs a difference determination as between the merged data and the source data records. The difference determination includes, for each source data record of the source data records, comparison of data in data fields of the merged data to the source data record. The method also performs processing with respect to the merged data based on the difference determination.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an example report showing degrees of difference between a merged data record and source data records of the example of FIG. 3, in accordance with aspects described herein;

DETAILED DESCRIPTION

Figure 1A:
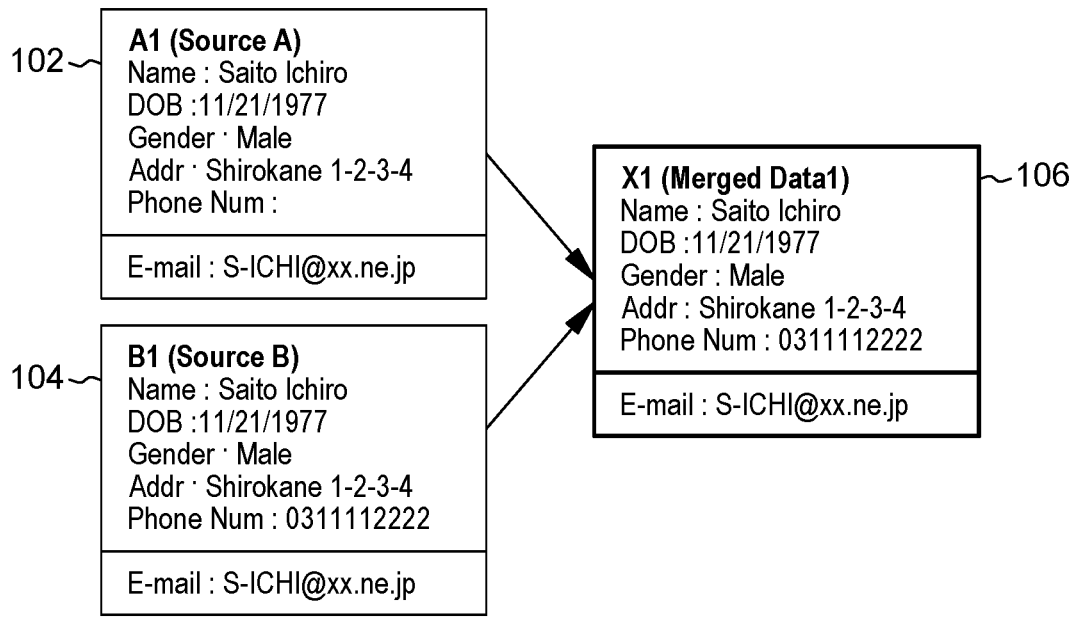
FIGS. 1A-1C depict example merge operations to merge data of source data records to create merged data.

Described herein are approaches for data merge processing based on differences between source data and merged data created therefrom. Aspects are described herein in the context of customer information housed in data records, though it is appreciated that aspects apply more generally to any type of source data and merged data created therefrom.

In a merge process, as customer information (source data) may be repeatedly updated, expanded, and consolidated with other customer information based on a merge key with respect to desired customer information item(s), the merged customer information may deviate, perhaps significantly, from the individual source data records from which the merged data is built. The occurrence of such deviations from the original (individual source) data records may indicate an error in merging—for instance a possible mistaken merge for different entities—and consequently a deterioration of quality of the merged data. Such problems are not addressed in current approaches, which instead too heavily rely on and assume that the merge key used in the merge process is accurate.

It can be difficult to detect deterioration of customer information caused in the merge process due to lack of reversibility. In general, there are no mechanisms for automatically detecting such deterioration. The deterioration may be revealed from an interrogation and review by a customer, but this is not a desired way of detecting such deterioration at least because of the potential damage to the reputation of the company holding the customer information when customers observe their data being merged with that of other entities. In cases where the deterioration is not discovered, then the problem persists and may become worse.

Aspects described herein identify customer information that is likely or anticipated to result in merge error and/or deteriorated quality based on ongoing merge processes. In a process of executing a merging operation (e.g. merging and survivorship operations), approaches described herein measure the degree of difference/similarities between customer information items (rather than, e.g., difference/similarity between the merge key used), and generate a report presenting customer information items and degrees of differences between source data and the merged data that is proposed to be maintained as a merged data record for that entity. The degrees of difference can identify potential merge errors and/or deteriorated quality, such as partial loss of data.

Merged data can change based on updates to the source records from which the merged data is determined. Updates may include changes to underlying source data records and/or expansion/removal of one or more source data records to the particular set of source data records being merged. Aspects described herein can regularly monitor the degree of difference between source data records and merged data, and, when the degree of difference exceeds threshold(s), automatically abort a merge operation and/or execute an unmerge operation, and generate an appropriate report.

Figure 1B:
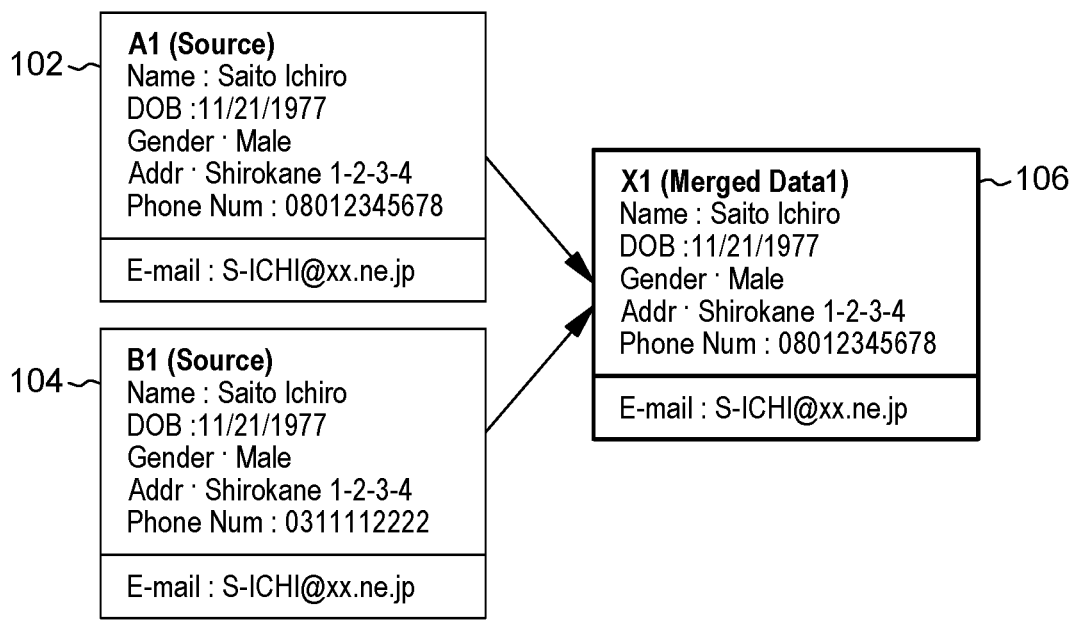
Figure 1C:
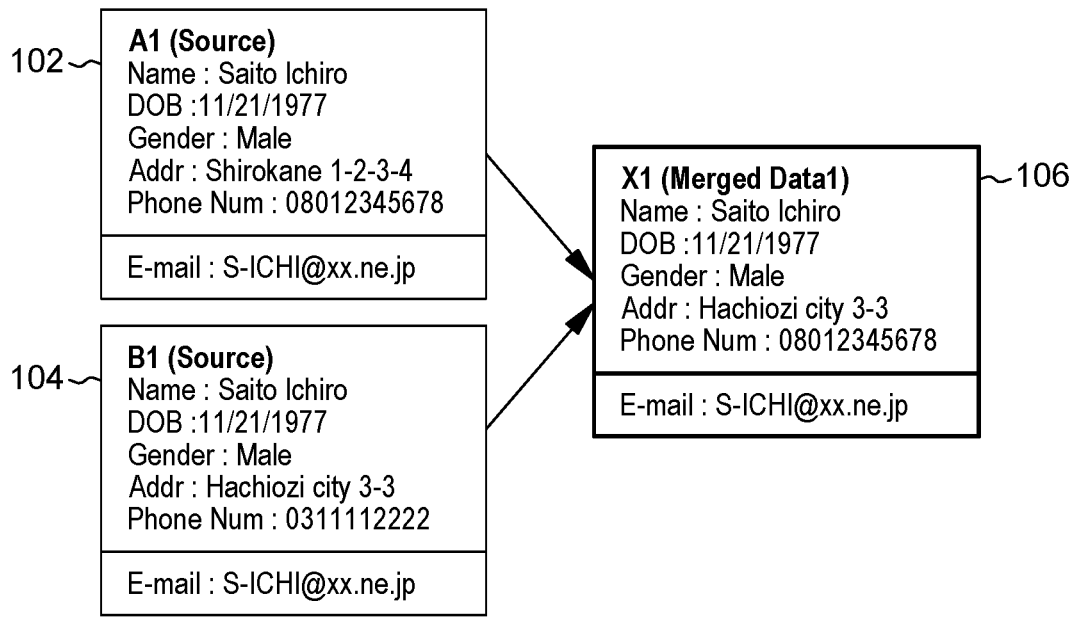

FIGS. 1A-1C depict example merge operations to merge data of source data records to create merged data. The examples depict creation of merged data from source data records, where the merged data includes data fields for which data is stored.

Referring initially to FIG. 1A, on April 30th a merge operation is executed on the basis of a merge key, such that source data records 102 and 104 (also identified as A1 and B1, respectively) are merged into merged data record 106 (also identified as X1). The source records 102 and 103 are merged based on a merge key, which could be determined in any desired manner, for instance as a function of different data values stored in the source records. The merge key is used to determine which source data records are regarded as being for a common entity (customer Saito Ichiro in this example) and therefore to (possibly) contribute to the merged data.

Each source data record 102, 104 includes data fields for name, date of birth (DOB), gender, address (Addr), phone number, and email address of a customer. Data is stored in the record for each such data field. In cases that a data field is blank (e.g. the phone number of source data record 102), the record need not actually have a data field and/or storage allocated to the data structure in which the record resides.

The source data records 102 and 104 are generally in alignment, in that the data in the name, DOB, gender, Addr, and email data fields match. The only difference in this example is that a phone number for the entity is specified in source data record 104 but no phone number is specified in record 102.

The data records 102 and 104 are merged to create merged data record 106, therefore specifying the name, DOB, gender, address, phone number (from record 104), and email address of the entity.

FIG. 1B depicts a change/update that occurred to record 102, as detected on May $7^{th}$. The update added a phone number to record 102. Consequently, as dictated by the particular survivorship rule(s) at play when merging 102 and 104 of FIG. 1B, the updated phone number in source data record 102 replaces the phone number already stored in the merged data for this customer. Record 106 is updated directly or overwritten with a replacement record such that updated phone number 08012345678 (from record 102) replaces prior phone number 0311112222 (from record 104) in the merged data. It is noted that individual source data record 104 is not changed in this example and still includes its prior-indicated phone number.

FIG. 1C depicts a change/update that occurred to record 104 as detected on May $21^{st}$. The update changes the customer address in record 104 to Hachiozi City 3-3. The updated address from source data record 104 therefore replaces the address in the merged data record 106 after another merge operation.

A difference determination can be performed periodically and/or as triggered by updates to source and/or merged data. A difference determination refers to a process of determining degree(s) of difference as between (i) merged data and (ii) one or more of the source data records. As described in further detail herein, the difference determination can include, for each source data record involved in a proposed merge or preliminary merge operation, comparing (i) data in data fields of the merged data to (ii) the source data record (i.e. the data, in the source record, for the corresponding data fields if present), to compare and determine whether/how the source and merged data differ from each other. The degree of difference between two records could be, as one example, a composite of individual degrees of difference between corresponding data points (e.g. name, address, email, etc.).

Figure 2:
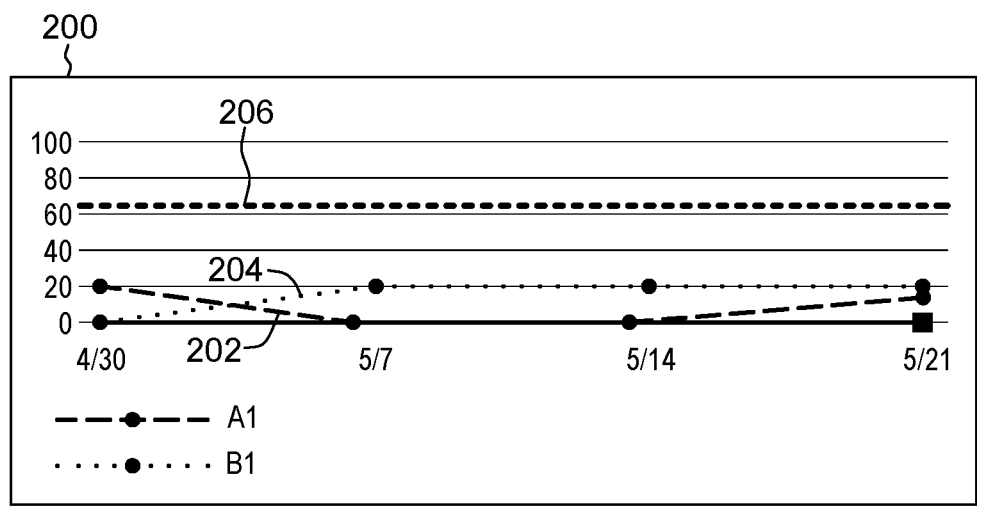
FIG. 2 depicts an example graphical representation of difference determinations as between merged data and source data records, in accordance with aspects described herein.

FIG. 2 depicts an example graphical representation 200 of difference determinations as between merged data and source data records, in accordance with aspects described herein. The x-axis spans a period of time encompassing four dates (April 30, May 7, May 14 and May 21) and the y-axis is a scale of degrees of difference from 0 to 100. Data points exist for each source record on each of the four dates, and show a degree of difference between the merged data on that date and the given source data record on that date. Plot 202 plots the degrees of difference between source data record 102 (A1) and the merged data (X1) across the four dates, while plot 204 plots the degrees of difference between source data record 104 (B1) and the merged data (X1) across the four dates.

On April $30^{th}$, as seen in FIG. 1A, merged data record 106 matches source data record 104 in that the data for each of the data fields of the merged data (name, date of birth, gender, address, phone number, email address) matches the data in source record 104 for each of those data fields. There is no difference between the two records in terms of the customer information being stored, and therefore the degree of difference is 0 as indicated in the graph of FIG. 2. Since source data record 102 has no phone number for the customer on April $30^{th}$ but the merged data record 106 does, this is regarded as a difference, and consequently the degree of difference between the two records on April $30^{th}$ is determined to be 20. Example approaches for determining such a degree of difference between two records are described elsewhere herein.

On May $7^{th}$, as indicated by FIG. 1B, updated phone number is added to record 102 and, as a result of merge processing, is propagated to merged data record 106. Source 102 and merged data 106 therefore match on May $7^{th}$, and the degree of difference therebetween drops from 20 to 0, as indicated by plot 202. Since the phone number of source record 104 on May $7^{th}$ is different from this updated phone number merged into record 106 on May $7^{th}$, the difference between source record 104 and merged record 106 on May $7^{th}$ increases from 0 to 20.

On May $14^{th}$, the difference determination is again performed. Since there were no updates to the source records between May $7^{th}$ and May $14^{th}$, and no additional records were added and merged into the merged data, no pertinent data has changed and the degree of difference for each source data record (102, 104) relative to the merged data remains the same. In this manner, the difference determination could be performed periodically—weekly in this example—regardless of whether changes have been observed. Additionally or alternatively, the difference determination could be triggered based on observing updates to existing source records or introduction of additional source data record(s) for merging, as examples.

After the update to the address in source record 104 on or before May 21st, then on May $21^{st}$ the degrees of difference are again determined. Source record 104 still differs from merged record 106 in that the phone numbers differ, but the change made to the address in record 104 and propagated to record 106 introduces no additional difference as between the two records. Consequently, the degree of difference between the two remains 20 as indicated by plot 204. Since now the address in source record 102 differs from that of merged record 106, the degree of difference between these two records increases from 0 to 15 in this example.

Threshold degree of difference line 206 represents a threshold degree of difference, and in this example it is set at 62. In accordance with aspects described herein, the threshold degree of difference can be set by an administrator or other user and dictate at what point a degree of difference between merged data and some source data is deemed unacceptable, and therefore the merge is potentially not to complete (i.e. is to abort, revert, etc.). In other words, if the degree of difference between the merged data and some number of source data records—for instance one or some other configurable number—exceeds the threshold, then it may be determined not to allow the merge to complete, on the basis that the (proposed) merged data is too different from the underlying source data. Such an extreme degree of difference can suggest that at least some of the involved source data record(s) may instead correspond to a different entity, and, for instance, that the merge key informing a merge between those source records is improper.

In the particular examples of FIGS. 1A-1C, and as represented in the graph of FIG. 2, the threshold 206 is not exceeded. The merges in FIGS. 1A, 1B, and 1C may all be allowed to complete/commit.

Figure 3:
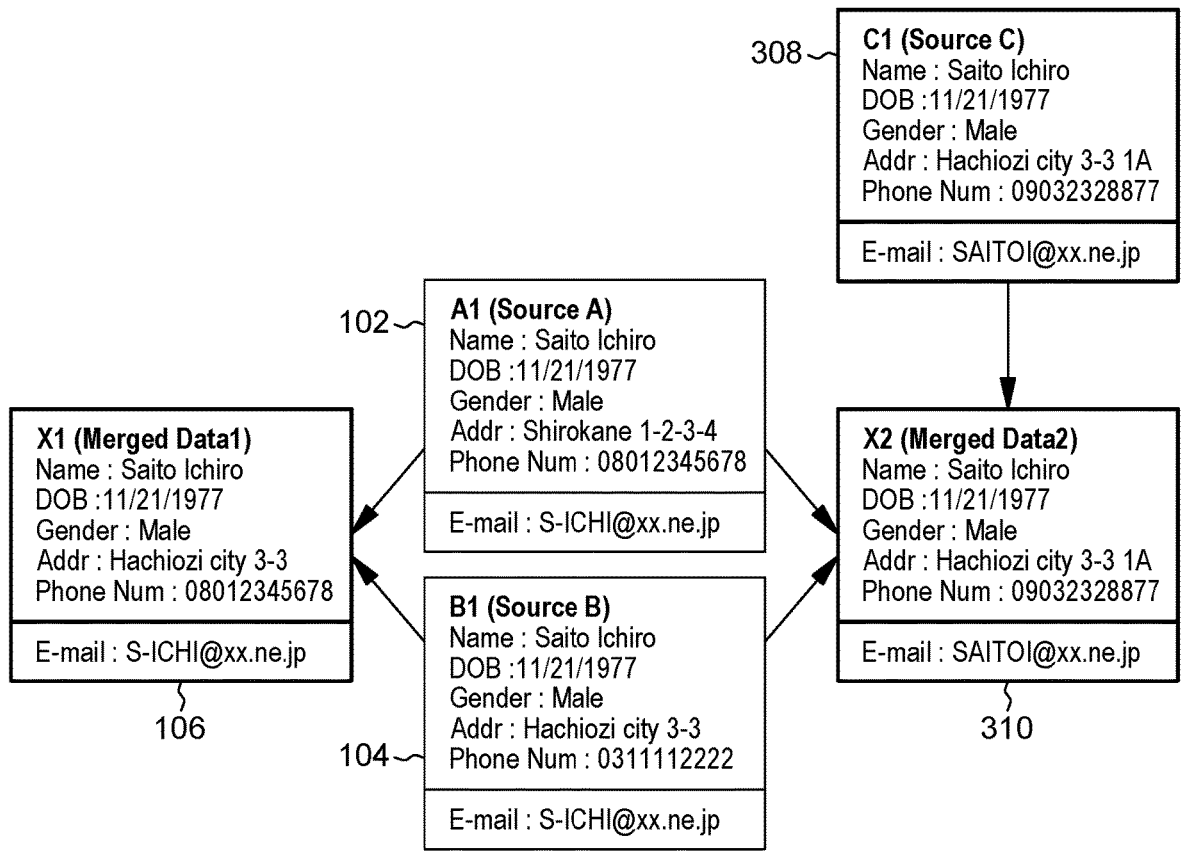
FIG. 3 depicts a further example merge operation based on addition of a source data record to produce an updated merged data record, in accordance with aspects described herein.

FIG. 3 depicts an extension of the prior example based on introduction of a new source data record 308. FIG. 3 therefore depicts a further example merge operation based on addition of this source data record to produce an updated merged data record, in accordance with aspects described herein. Here, source data record 308 is added between May $21^{st}$ and May $28^{th}$ and includes name, date of birth, gender, address, phone number, and email information for a customer. The merge key being used indicates that record 308 is a candidate for merging with the other source data records (102, 104). Thus, updated merged data (e.g. record 310) is created to potentially replace the initial merged data record (106) as the up-to-date merged data. On the basis that source record 308 supplies what is purported to be the most recent information for this customer, merged data record 310 includes updated address (Hachiozi city 3-3 1A), updated phone number (0903232887), and updated email address (saitoi@xx.ne.jp), all of which differ from the information in merged record 106 for these data fields, and differ from the corresponding address, phone, and email data in records 102 and 104. The name, date of birth, and gender is consistent as between all of the records 102, 104, 106, 308, and merged record 310.

The update in this example includes an addition of added source data record 308 to the collection of involved source data records. That is, the collection of source data records involved in the merge expands from {102, 104} to {102, 104, 308}. In this situation, an initial merged record (106) is already stored and includes merged data prior to this update to the collection. Merged data is created after the addition of record 308, and this merged data is in the form of a replacement merged data record (310) in this example, to potentially replace the initial merged data record 106 as far as what is considered to be the most up-to-date merger of entity information. However, in accordance with aspects described herein, a difference determination is made and further processing by a computer system with respect to the merged data (e.g. record 310 here) is performed.

Figure 4:
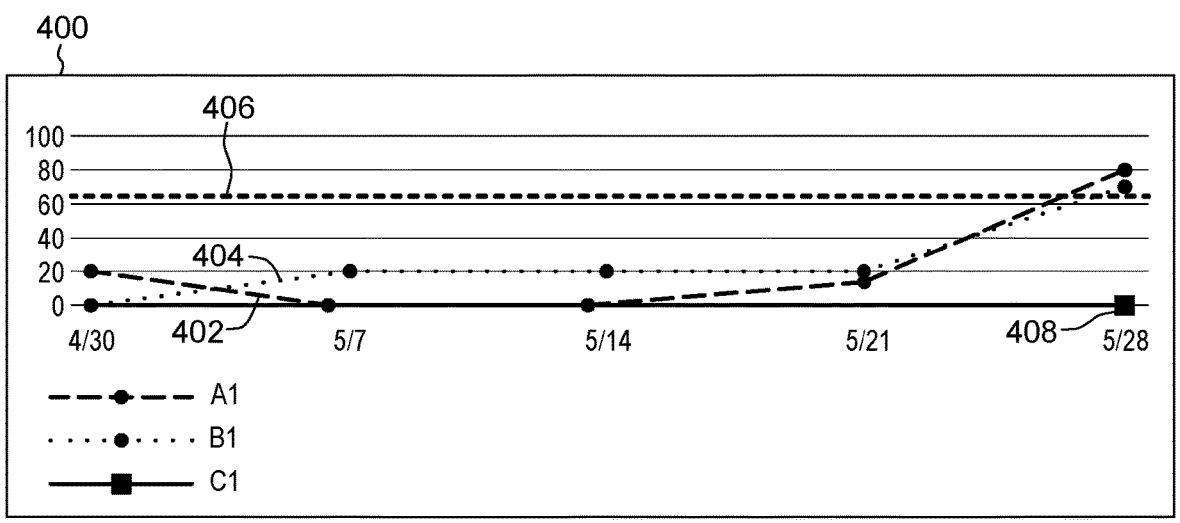
FIG. 4 depicts an updated version of the example graphical representation of FIG. 2 based on the addition of a source data record of FIG. 3, in accordance with aspects described herein.

FIG. 4 depicts an updated version of the example graphical representation 400 of FIG. 2 based on the addition of source data record 308 of FIG. 3, in accordance with aspects described herein. In FIG. 4, new data points are added for May $28^{th}$. Plots 402 and 404 include added points for May $28^{th}$ that show the degrees of difference between the merged data (310) and source data records 102 and 104 (respectively) on May 28th. Source record 308 has only one datapoint (408) since it was added in this example after May $21^{st}$.

A degree of difference as between each source data record (102, 104, 308) and the proposed new merged data (e.g. record 310) is determined. New source record 308 exhibits no difference as compared to merged record 310, and therefore the degree of difference is 0 as indicated by point 408. However, due to differences in address, phone number, and email as between the merged data (310) and each of records 102 and 104, their respective degrees of difference increase, significantly in this example to 80 and 70, respectively. Their scores differ from each other because they include differing phone numbers relative to each other, which result in different degrees of difference when compared to the phone number in record 310.

The respective degrees of difference between merged data 310 and records 102, 104 each exceed the threshold of 62 in this example. Whether this dictates to abort the merge is based on an abort threshold governing how these situations are handled. This abort threshold can be based on any desired determination. For instance, the merge may be aborted on the basis that the degree of difference for at least one source data record exceeds the threshold of 62. Alternatively, it could be aborted on the basis that the degrees of difference for a majority (two or more in this example) of the source data records exceed the threshold of 62. In the example of FIG. 4, the merge is aborted under either scenario. In other examples, a minimum number of source records is set and the merge is aborted if at least that minimum number of records exceed the threshold. In yet other examples, degrees of difference across the source data records can be averaged, and compared to a threshold to determine whether to abort.

Additionally or alternatively, multiple thresholds could be set. For instance, another threshold could be set at 68. One threshold (406, set at 62) could dictate that the merge is to be aborted if two or more source data records exceed that threshold, while the other threshold (set at 68) could dictate that the abort should occur if any source data record exceeds that threshold.

In the case of an abort, processing performed includes aborting replacement of the initial merged data record (106) with the replacement merged data record (310) and removing the replacement merged data record (310), for instance deleting it or archiving it. Based on aborting, the process could then regard and store the added source data record (308) as representing a different entity than that the customer represented by the initial merged data record (106).

If the abort threshold is not exceeded, i.e. the merge can complete, then processing performed can include storing and maintaining a merged data record (310) that includes the merged data. It is noted that the merged data that participates in the difference determination may initially exist not as a merged data record per se (as in FIG. 3) but in some other form, for instance in volatile memory and not committed to a database as a data record, as an example. The merged data may be maintained in this manner while the difference determination is made. Only if the merge does not abort may a new merged data record be built and populated with the merged data for replacing any prior merged data record if it exists. In other examples, the merged data is maintained in a record that is marked as being provisional and not committed, until the merge operation completes without being aborted or reverted.

Accordingly, aspects can regularly (i.e. periodically or aperiodically) measure the degrees of difference between merged data and source data records. When degree(s) of difference exceed established threshold(s), an unmerge or abort can be automatically executed/performed. To aid a user or administrator in understanding merge operations that have completed or aborted, a report can be generated and displayed, as described elsewhere herein.

Figure 5:
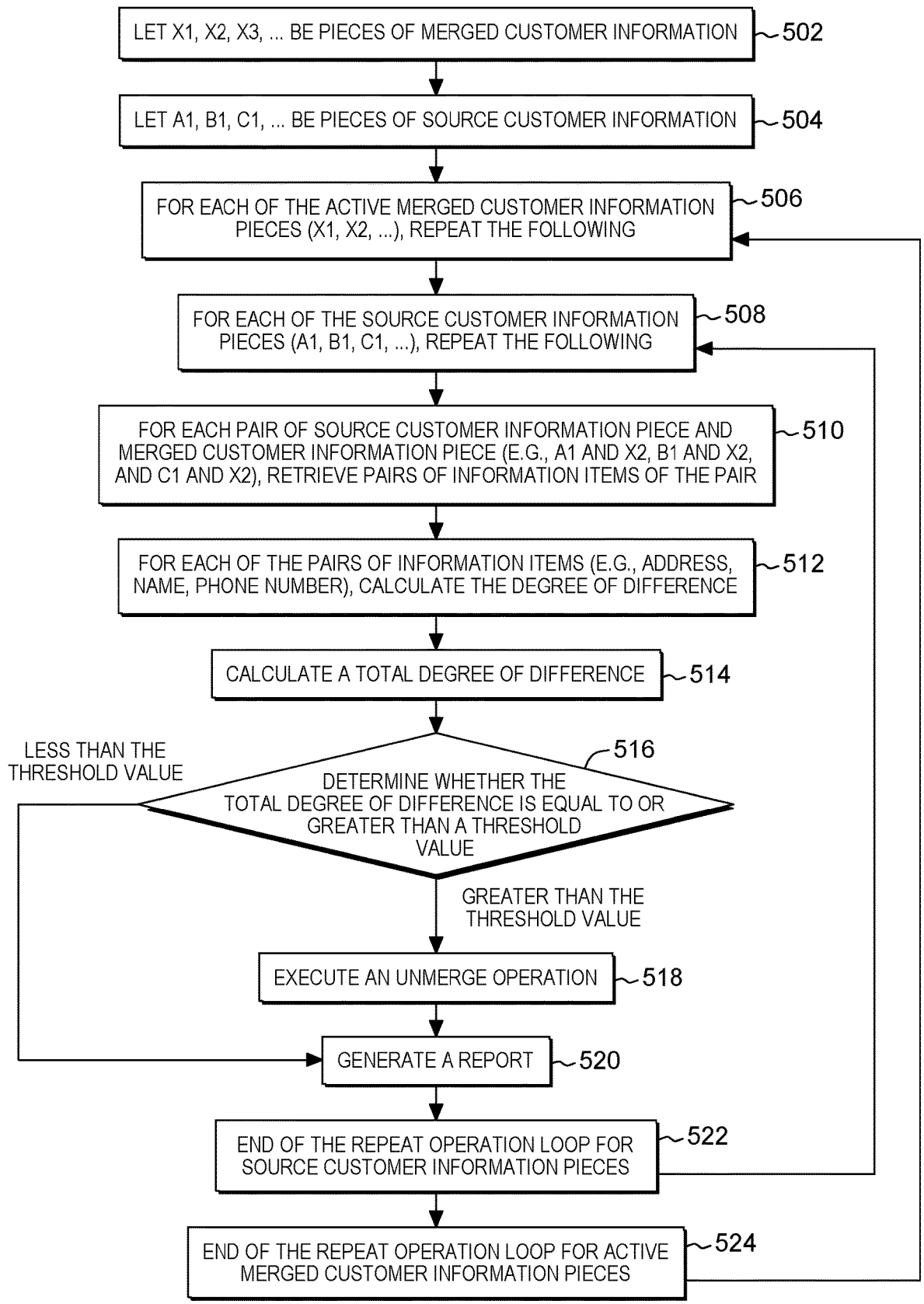
FIG. 5 depicts an example process for data merge operations, in accordance with aspects described herein.

Regular difference measurement can be conducted by carrying out an example process for a data merge operation, in accordance with aspects described herein and as presented with reference to FIG. 5. In one example, the process is performed by a computer system each time customer information of source data record(s) is updated and/or new source data records with a matching merge key are added. Additionally or alternatively, the process is performed periodically, for instance each week.

Initially, at 502, let X1, X2, . . . represent pieces (merged data records) of merged customer information, and at 504 let A1, B1, . . . represent pieces (source data records) of source customer information. The process enters an outer loop, beginning at 506, for each active merged customer information piece X1, X2, . . . . The process then enters an inner loop beginning at 508, such that, for each such merged customer information piece X1, X2, . . . , the process performs the following for each source customer information piece A1, B2, . . . :

For the pair of records that includes the merged information piece and the source customer information piece that is the subject of this iteration of the inner loop, retrieve pairs of information items of the pair of records (510). That is, retrieve the data for corresponding data fields (e.g. customer name from each record, customer phone number from each record, etc.);

For each such pair of information, calculate a degree of difference between the two items of the pair (512). This is referred to as an individual degree of difference;

Calculate the total degree of difference between the pair of records (514), e.g. as a composite of the individual degrees of difference between the pairs of information identified by 510;

Determine whether the total degree of difference is equal to or greater than a threshold (516);

If not, then proceed to 520 to generate a report. Otherwise, execute an unmerge operation (518) and proceed to 520.

At 520, generate a report (for instance as described with reference to FIG. 6);

At 522, iterate the inner loop, by proceeding back to 508 for iterating to a next customer information piece, if applicable, for the given merged customer information piece being processed during this iteration of the outer loop, otherwise proceed to 524;

At 524, iterate the outer loop, proceeding back to 506 for iteration to a next merged customer information piece, if applicable, otherwise end.

Approaches are now described for calculating degrees of difference. In some aspects, respective information items from a pair of records are compared for an individual degree of difference. Thus, determining a degree of difference between merged data and a source data record can include determining individual degrees of difference between the source data record and the merged data for each of the data fields of the merged data. Then, an overall degree of difference between the merged data and the source data record can include, e.g., a composite, such as a weighted average or weighted sum, of those individual degrees of difference.

Sometimes it may be desirable to first normalize data of a data field, particularly in cases where data may be considered equivalent though not necessarily alphanumerically identical. Taking a name data field as an example, the names Saitou Ichirou, Saito Ichiro, and Saitoo Ichiroo may all be deemed equivalent to each other (e.g. on the basis that it is a native Japanese name expressed in a Latin alphabet, and therefore subject to discretionary alphanumeric translation). As another example, the dates "2013-04-22", "4/22/13", and "04/22/2013" may all be deemed equivalent. A normalization process can ensure that these type of situations do not result in inflated degrees of difference.

After any normalization, the degree of match between the data being compared to each other can be measured using any desired approach, for instance an edit distance (e.g. Levenshtein distance). In a particular example, a full score is assumed for a complete match, and an amount of score points are subtracted for each modification/edit, to obtain the degree of match. The degree of match can then be reversed/inverted to obtain the degree of difference. Thus, an individual degree of difference as between a source data record and the merged data may be a function of an edit distance between data for the data field and data, of the source data record, corresponding to that data field.

Using the A1 source data record (102) and merged data record 310 of FIG. 3 as a specific example, and assuming a 'full match' score is 30 and 5 point subtractions: the degree of match for the name data field is 30 and degree of difference is (30−30=0) indicating no difference, as the names of both records match; the degree of match for the DOB data field is 30 and degree of difference is (30−30=0) indicating no difference, as the DOB of both records match; the degree of match for the gender data field is 30 and degree of difference is (30−30=0) indicating no difference, as the gender of both records match; the degree of match for the email data field is (30−5*3=15), given three different characters, and the degree of difference is therefore (30−15=15); the degree of match for the address data field is 0 (no match) and there the degree of difference is (30−0=30); and the degree of match for the phone number data field is 0 (no match) and therefore the degree of difference is (30−0=30).

Weighting factors can be applied to the individual degrees of difference if desired. The total/composite degree of difference between the two records can be determined based on applying the weighting factors to these individual information items. Certain items can be weighted less or more important than others. For instance, 'gender' and 'date of birth' can be equally weighted higher than 'name', which is weighted higher than 'cell phone number', which is weighted higher than 'email address', which is weighted higher than 'address' and 'home phone number' which are equally weighted. In this manner, weights assigned to the individual degrees of difference can weigh at least some individual degrees of difference different than other individual degrees of difference.

Using the example above and based on weighing name at 1.5, DOB at 2, gender at 2, email at 1.3, address at 1, and phone at 1, the weighted individual degrees of difference would be: name=0, DOB=0, gender=0, email=15*1.3=19.5, address=30*1=30, and phone number=30*1=30. The total/composite degree of difference between the merged data and source data, which in this example is a simple total of the above weighted degrees of difference, is 19.5+30+30=79.5.

In some examples, the merge is aborted if this composite exceeds a given threshold. In other examples, the merge is aborted based on an individual degree of difference exceeding a difference threshold (for instance any degree of difference exceeding 25).

A report can be generated and displayed for a user to indicate, as examples, individual degrees of difference between each source data record and the merged data for the data fields of the merged data, and a composite degree of difference between each such source data record and the merged data. A process can check the degree of difference by each data field, and identify data with a high degree of difference that may have caused an unmerge/abort. In examples, records/data are presented in a stacked manner to allow identification of inconsistent data portions. This is illustrated in FIG. 6, which depicts an example report showing degrees of difference between a merged data record and source data records of the example of FIG. 3, in accordance with aspects described herein. The report shows two report items 602, 604 showing differences between the merged data X2 (310) and source reports A1 (102) and B1 (104). The individual degrees of difference are shown for the name, DOB, gender, email, address, and phone number data items. The composite degree of difference in these examples is an unweighted total of the individual degrees of difference, i.e. 80 for the A1<->X2 comparison and 70 for the B1<->X2 comparison.

Also of note is that the data that differs between the merged data and each source record is shown being stacked. That is, data differing as between a source data record and the merged data for a data field of the merged data is overlaid in the displayed report. Thus, the email, address, and phone number for the merged data and the source records 102, 104 are shown in their respective report items 602, 604 as overlapping. The overlapping produces a convolution that a user can observe to easily identify that differences exist for those data items. In some examples, each overlapped data item is differently colored.

Aspects described herein provide identification of data having deteriorated quality that have been subjected to an unintended data conversion by cleansing, normalization, and/or merging operation(s) on entity data, e.g. customer information, product information, or any other type of data. High-accuracy data management per distinct entity is thereby facilitated.

With regard to a data conversion process with reversibility, aspects described herein can be utilized to determine the accuracy of the data by measuring the degree of difference between data automatically restored after a data conversion process and the original data.

Approaches are provided for merging pieces of source data having merge key(s). In particular embodiments, a process includes aspects such as setting a weighting factor for each of several merge keys; creating merged source data by correspondingly merging the merge keys of the pieces of source data, where the creating the merged source data includes applying the weight factors of the merge keys respectively to differences between the merge keys of the pieces of source data to compute a first degree of difference; when the first degree of difference exceeds a predetermined value, aborting the creating the merged source data, and presenting an alert/report; when the first degree of difference does not exceed the predetermined value, applying the weighting factors of the merge keys correspondingly to differences between the merge keys of a plurality of pieces of merged source data of the past, to determine a second degree of difference; based on the second degree of difference exceeding a predetermined value, aborting the creating the merged source data and presenting an alert/report; and based on the second degree of difference not exceeding the predetermined value, continuing the creating the merged source data.

Figure 7:
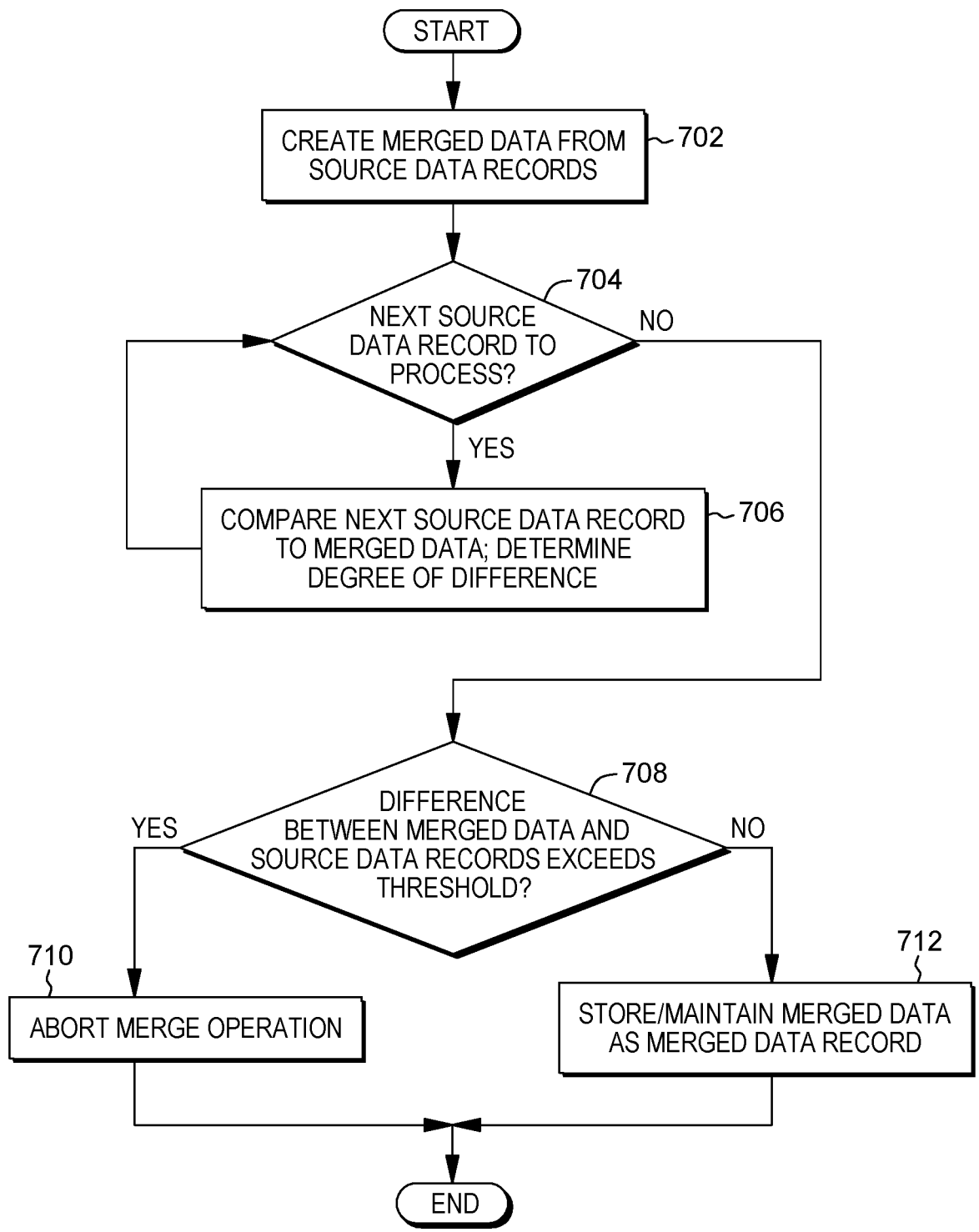
FIG. 7 depicts example data merge processing based on a difference determination as between source and merged data, in accordance with aspects described herein.

FIG. 7 depicts example data merge processing based on a difference determination as between source and merged data, in accordance with aspects described herein. In some examples, the process is performed by one or more computer systems, such as a database management system and/or other computer system as described herein.

The process creates (702) merged data from a plurality of source data records. The merged data includes a plurality of data fields. At that point, a difference determination as between the merged data and the plurality of source data records is performed, which includes, for each source data record of the plurality of source data records, comparison of data in data fields of the merged data (e.g. name, address, email, etc.) to the source data record, particularly the data for corresponding data fields in the source record. This compares the data of the merged data to each of the source records to see how they differ. Referring to FIG. 7, the process enters a loop that repeats as long as there is a next source data record to process. A determination (704) is made as to whether there is a next source data record to process. If so (704, Y), the process compares (706) that next source record to the merged data and determines a degree of difference between the merged data and that source data record. The degree of difference can be an overall/total/composite of individual degrees of difference as described herein, i.e. for the various data fields. The process then loops back to 704 and repeats as long as there remains (704, Y) at least one unprocessed source data record. Thus, the difference determination can include determining a degree of difference between the merged data and each source data record of the plurality of source data records.

Alternatively, it may be desired to break from the loop if the degree of difference between the merged data and a source data record exceeds some threshold that immediately dictates the merge is to abort and it would therefore be inefficient to further process any more source data records.

As noted, determining a degree of difference between the merged data and a source data record of the plurality of source data records can include determining individual degrees of difference between the source data record and the merged data for each of the data fields of the merged data, and the degree of difference between the merged data and the source data record can include a composite of the individual degrees of difference. In some examples, the process also assigns weights to the individual degrees of difference, the assigned weights weighing at least some individual degrees of difference different than other individual degrees of difference. An individual degree of difference between the source data record and the merged data for a data field of the merged data could be a function of an edit distance between data for the data field and data, of the source data record, corresponding to that data field.

Based on breaking from the loop between 704 and 706, for instance if it is determined at 704 that there is no next source data record to process (704, N), the process continues by determining (708) whether the difference between the merged data and the source data records exceeds a threshold. The noted difference could be, as examples, for an individual degree of difference for a given source data record, for a composite of the individual degrees of difference for a source data record, for an average of the composite degrees of difference across all source data records, for a threshold number of source data records, etc.

Further processing is performed with respect to the merged data based on the difference determination. If the difference between the merged data and the source records exceeds the threshold (708, Y), then the process aborts (710) the merge operation. Otherwise the difference between the merged data and the source records does not exceed the threshold (708, N) and the process stores/maintains the merged data as a merged data record.

Thus, the outcome of determination 708 dictates further processing with respect to the merged data. In one example, if composite degree(s) of difference between the merged data and a threshold number of source data records of the plurality of source data records exceeds a difference threshold, determination 708 is answered affirmatively, which informs that the further processing with respect to the merged data abort a merge operation to save (i.e. that would have saved, if not aborted) a merged data record with that merged data. Alternatively, in an example where individual degrees of difference could cause an abort to the merge operation, then based on an individual degree of difference between a source data record and the merged data for a data field of the merged data exceeding a difference threshold, determination 708 is answered in the affirmative and the process aborts the merge operation to save the merged data record with the merged data.

If determination 708 is answered in the negative, the process stores/maintains a merged data record including the merged data. This may be based on, as one example, the difference determination determining, for each source data record of the plurality of source data records, that the degree of difference between the merged data and the source data record does not exceed a threshold.

As an enhancement, a report can be generated and displayed. The report can include, for each source data record of the plurality of source data records, individual degrees of difference between the source data record and the merged data for each of the plurality of data fields of the merged data, and a composite degree of difference between the source data record and the merged data, where data differing as between the source data record and the merged data for a data field of the merged data is overlaid in the displayed report.

In certain situations, such as that of FIG. 3 where there exists an initial merged data record and a determination is being made whether to replace it, the creation of merged data (e.g. X2) from the plurality of source data records is based on an update to the plurality of source data records, the update being (i) an update to data of at least one source data record of the plurality of source data records, and/or (ii) an addition of at least one source data record to the plurality of source data records. The initial merged record (X1) is already stored and includes merged data prior to the update to the plurality of source data records. Creating the merged data creates a replacement merged data record (X2) to replace the initial merged data record (X1). However, in the case of FIG. 3, the processing aborts replacement of the initial merged data record with the replacement merged data record and remove the replacement merged data record, based on the difference determination determining a degree of difference between the merged data (X2) and one or more source data records of the plurality of source data records after the update exceeds a threshold. In situations like that of FIG. 3, where the update is a source record being added but the merged is aborted, the added source data record can be stored to represent a different entity than an entity represented by the initial merged data record (X1).

Although various examples are provided, variations are possible without departing from a spirit of the claimed aspects.

Figure 8:
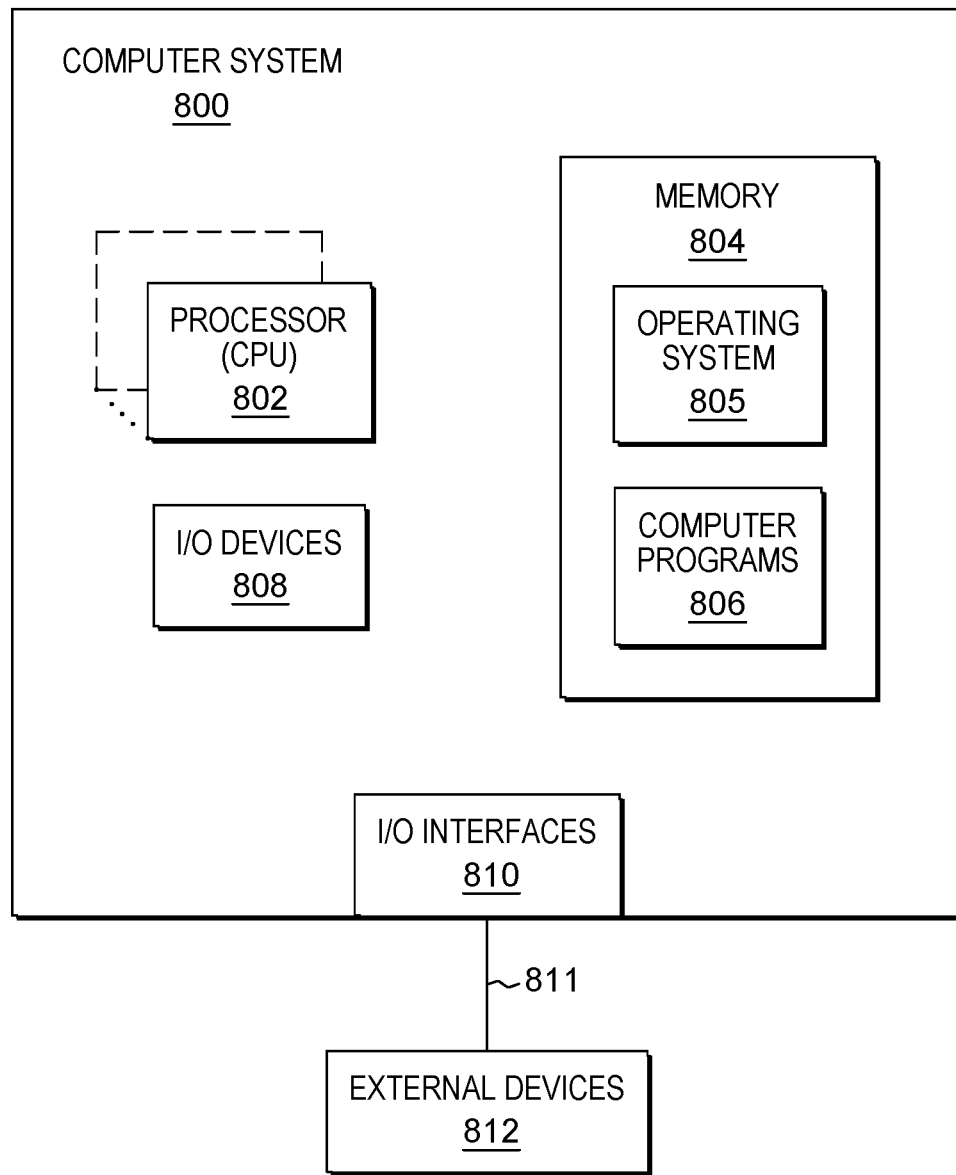
FIG. 8 depicts one example of a computer system and associated devices to incorporate and/or use aspects described herein.

Processes described herein may be performed singly or collectively by one or more computer systems, such as one or more database management systems, as an example. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
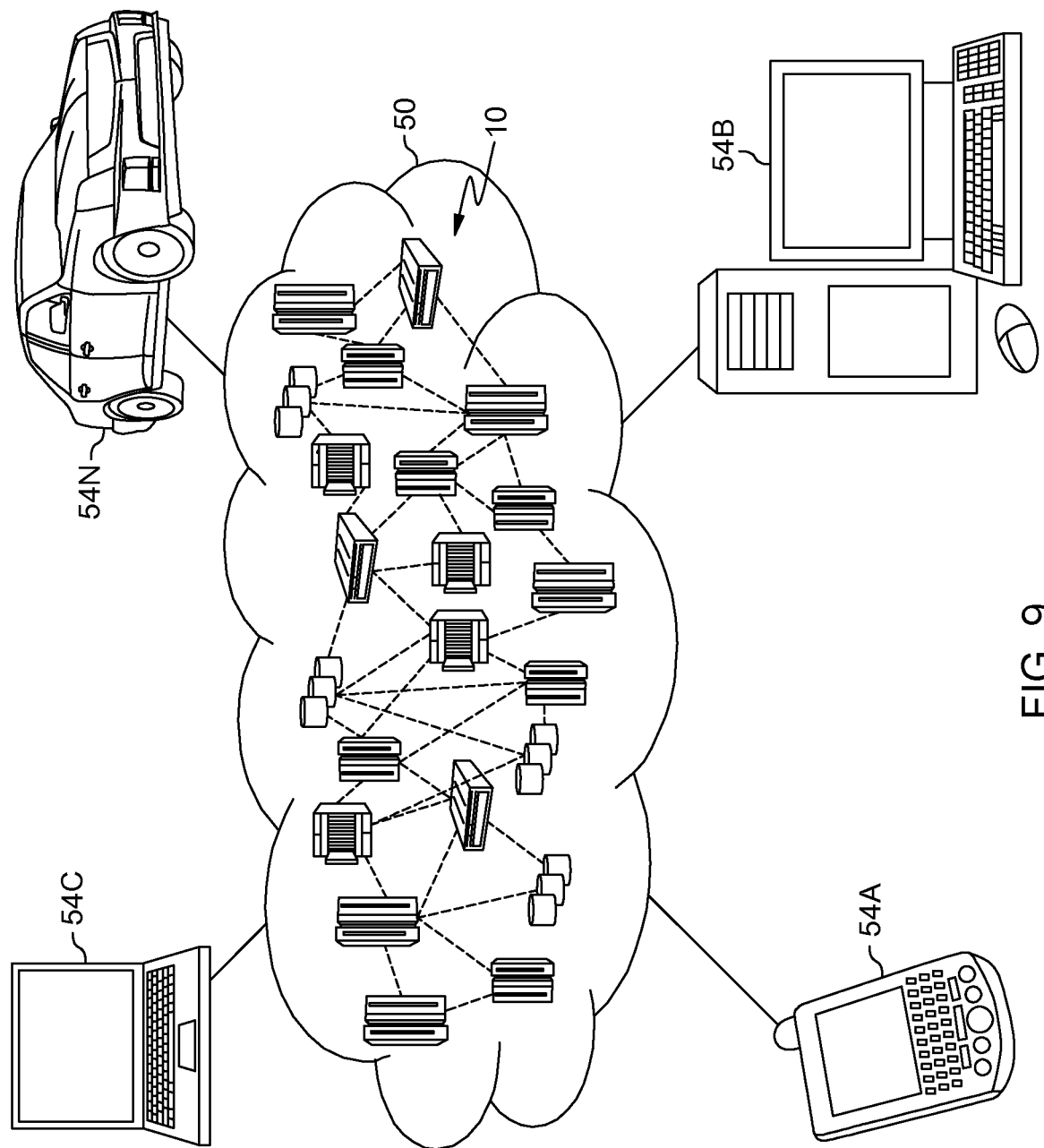
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
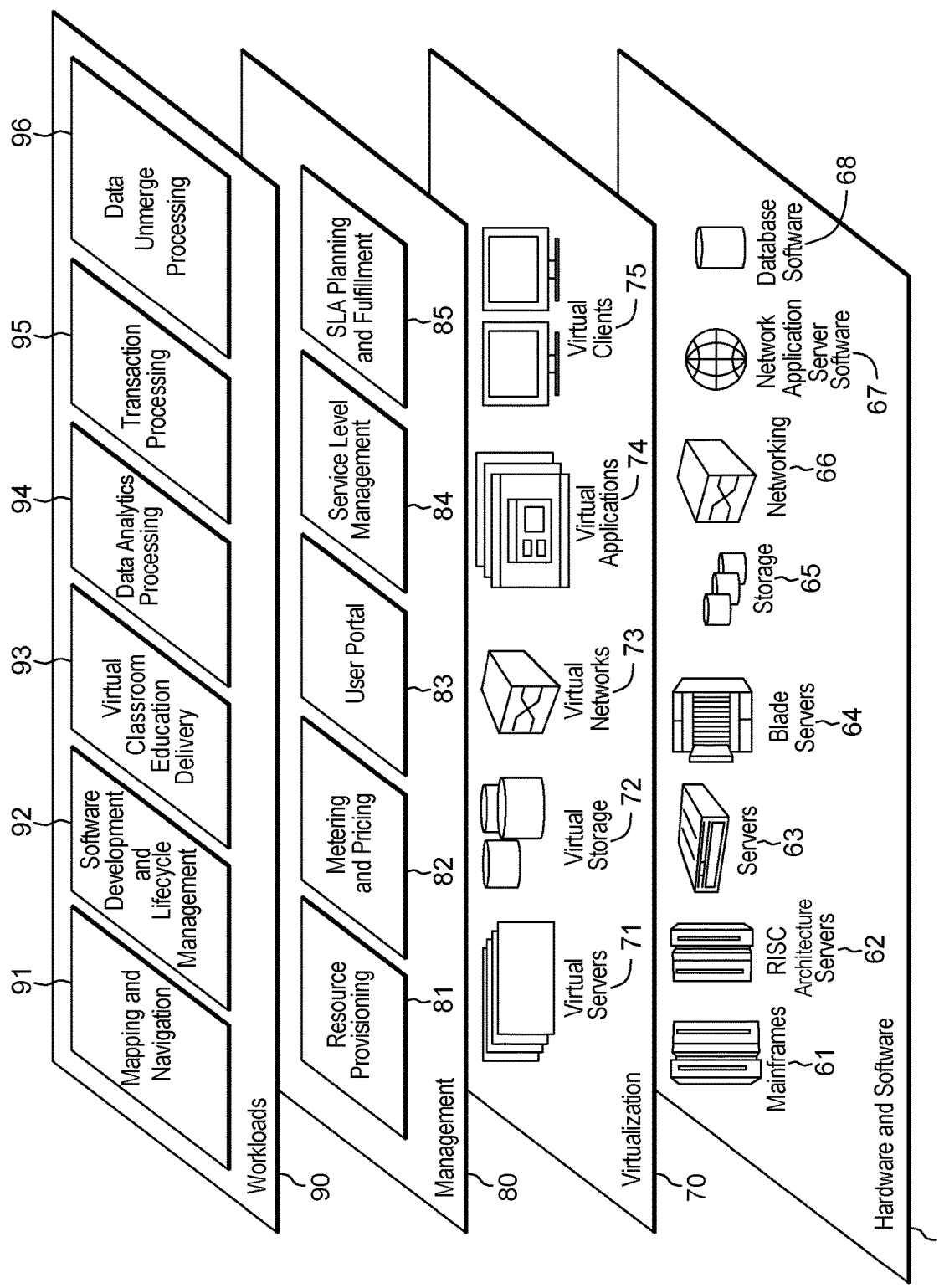
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data unmerge processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   merging data from a plurality of source data records to produce merged data that includes a plurality of data fields;
   based on the merging the data from the plurality of source data records to produce the merged data, performing a difference determination that compares the merged data to each source data record of the plurality of source data records from which the merged data was produced, the difference determination comprising, for each source data record of the plurality of source data records, comparing data in data fields of the merged data to the source data record; and
   performing processing with respect to the merged data based on the difference determination.

2. The method of claim 1, wherein the difference determination comprises determining a degree of difference between the merged data and each source data record of the plurality of source data records.

3. The method of claim 2, wherein determining a degree of difference between the merged data and a source data record of the plurality of source data records comprises determining individual degrees of difference between the source data record and the merged data for each of the data fields of the merged data, and wherein the degree of difference between the merged data and the source data record comprises a composite of the individual degrees of difference.

4. The method of claim 3, wherein the method further comprises assigning weights to the individual degrees of difference, the assigned weights weighing at least some individual degrees of difference different than other individual degrees of difference.

5. The method of claim 3, wherein based on a composite degree of difference between the merged data and a threshold number of source data records of the plurality of source data records exceeding a difference threshold, the performing processing comprises aborting a merge operation to save a merged data record with the merged data.

6. The method of claim 3, wherein based on an individual degree of difference between a source data record and the merged data for a data field of the merged data exceeding a difference threshold, the performing processing comprises aborting a merge operation to save a merged data record with the merged data.

7. The method of claim 3, wherein an individual degree of difference between the source data record and the merged data for a data field of the merged data is a function of an edit distance between data for the data field and data, of the source data record, corresponding to that data field.

8. The method of claim 3, further comprising generating and displaying a report comprising, for each source data record of the plurality of source data records, individual degrees of difference between the source data record and the merged data for each of the plurality of data fields of the merged data, and a composite degree of difference between the source data record and the merged data, wherein data differing as between the source data record and the merged data for a data field of the merged data is overlaid in the displayed report.

9. The method of claim 1, wherein the merging the data from the plurality of source data records is based on an update to the plurality of source data records, the update comprising at least one selected from the group consisting of: (i) an update to data of at least one source data record of the plurality of source data records, and (ii) an addition of at least one source data record to the plurality of source data records, wherein an initial merged record is stored and comprises merged data prior to the update to the plurality of source data records, wherein the merging the data from the plurality of source data records creates a replacement merged data record to replace the initial merged data record, and wherein the performing processing comprises: aborting replacement of the initial merged data record with the replacement merged data record and removing the replacement merged data record based on the difference determination determining that a degree of difference between the merged data and a source data record of the plurality of source data records after the update exceeds a threshold.

10. The method of claim 9, wherein the update comprises an addition of an added source data record to the plurality of source data records, and wherein based on the aborting, the method further comprises storing the added source data record to represent a different entity than an entity represented by the initial merged data record.

11. The method of claim 1, wherein the performing processing comprises storing and maintaining a merged data record comprising the merged data, based on the difference determination determining, for each source data record of the plurality of source data records, that the degree of difference between the merged data and the source data record does not exceed a threshold.

12. A computer system comprising:
    a memory; and
    a processor in communication with the memory, wherein the computer system is configured to perform a method comprising:
      merging data from a plurality of source data records to produce merged data that includes a plurality of data fields;
      based on the merging the data from the plurality of source data records to produce the merged data, performing a difference determination that compares the merged data to each source data record of the plurality of source data records from which the merged data was produced, the difference determination comprising, for each source data record of the plurality of source data records, comparing data in data fields of the merged data to the source data record; and performing processing with respect to the merged data based on the difference determination.

13. The computer system of claim 12, wherein the difference determination comprises determining a degree of difference between the merged data and each source data record of the plurality of source data records, wherein determining a degree of difference between the merged data and a source data record of the plurality of source data records comprises determining individual degrees of difference between the source data record and the merged data for each of the data fields of the merged data, and wherein the degree of difference between the merged data and the source data record comprises a composite of the individual degrees of difference.

14. The computer system of claim 13, wherein the method further comprises assigning weights to the individual degrees of difference, the assigned weights weighing at least some individual degrees of difference different than other individual degrees of difference.

15. The computer system of claim 13, wherein the method further comprises generating and displaying a report comprising, for each source data record of the plurality of source data records, individual degrees of difference between the source data record and the merged data for each of the plurality of data fields of the merged data, and a composite degree of difference between the source data record and the merged data, wherein data differing as between the source data record and the merged data for a data field of the merged data is overlaid in the displayed report.

16. The computer system of claim 12, wherein the merging the data from the plurality of source data records is based on an update to the plurality of source data records, the update comprising an addition of at least one source data record to the plurality of source data records, wherein an initial merged record is stored and comprises merged data prior to the update to the plurality of source data records, wherein the merging the data from the plurality of source data records creates a replacement merged data record to replace the initial merged data record, wherein the performing processing comprises aborting replacement of the initial merged data record with the replacement merged data record and removing the replacement merged data record, based on the difference determination determining that a degree of difference between the merged data and a source data record of the plurality of source data records after the update exceeds a threshold, and wherein the method further comprises, based on the aborting, storing the added source data record to represent a different entity than an entity represented by the initial merged data record.

17. A computer program product comprising:
a computer readable storage medium readable by a processing circuit and storing instructions for execution by the processing circuit for performing a method comprising:

merging data from a plurality of source data records to produce merged data that includes a plurality of data fields;

based on the merging the data from the plurality of source data records to produce the merged data, performing a difference determination that compared the merged data to each source record of the plurality of source data records from which the merged data was produced, the difference determination comprising, for each source data record of the plurality of source data records, comparing data fields of the merged data to the source data record; and performing processing with respect to the merged data based on the difference determination.

18. The computer program product of claim 17, wherein the difference determination comprises determining a degree of difference between the merged data and each source data record of the plurality of source data records, wherein determining a degree of difference between the merged data and a source data record of the plurality of source data records comprises determining individual degrees of difference between the source data record and the merged data for each of the data fields of the merged data, and wherein the degree of difference between the merged data and the source data record comprises a composite of the individual degrees of difference.

19. The computer program product of claim 18, wherein the method further comprises generating and displaying a report comprising, for each source data record of the plurality of source data records, individual degrees of difference between the source data record and the merged data for each of the plurality of data fields of the merged data, and a composite degree of difference between the source data record and the merged data, wherein data differing as between the source data record and the merged data for a data field of the merged data is overlaid in the displayed report.

20. The computer program product of claim 17, wherein the merging the data from the plurality of source data records is based on an update to the plurality of source data records, the update comprising an addition of at least one source data record to the plurality of source data records, wherein an initial merged record is stored and comprises merged data prior to the update to the plurality of source data records, wherein the merging the data from the plurality of source data records creates a replacement merged data record to replace the initial merged data record, wherein the performing processing comprises aborting replacement of the initial merged data record with the replacement merged data record and removing the replacement merged data record, based on the difference determination determining that a degree of difference between the merged data and a source data record of the plurality of source data records after the update exceeds a threshold, and wherein the method further comprises, based on the aborting, storing the added source data record to represent a different entity than an entity represented by the initial merged data record.

* * * * *